United States Patent
Pfuntner (10) Patent No.: US 6,880,255 B2
(45) Date of Patent: Apr. 19, 2005

(54) HIGHWAY PARAMETER GAUGE FOR PRECISE OPERATION OF A TRACTOR-TRAILER

(76) Inventor: William J. Pfuntner, Box 212, Perkinsville, NY (US) 14529

( * ) Notice: Subject to any disclaimer, the term of this patent is extended or adjusted under 35 U.S.C. 154(b) by 0 days.

(21) Appl. No.: 10/364,772

(22) Filed: Feb. 11, 2003

(65) Prior Publication Data
US 2004/0154173 A1 Aug. 12, 2004

(51) Int. Cl.[7] ............................................. G01D 21/00
(52) U.S. Cl. ........................... 33/264; 33/286; 116/28 R
(58) Field of Search ........................... 33/264, 276, 277, 33/286, 265; 116/28 R (56) References Cited

U.S. PATENT DOCUMENTS

| | | | | |
|---|---|---|---|---|
| 685,455 | A | * 10/1901 | Kinkead | 33/286 |
| 3,945,127 | A | * 3/1976 | Spencer | 33/265 |
| 5,231,765 | A | * 8/1993 | Sherman | 33/265 |
| 5,685,081 | A | * 11/1997 | Winegar | 33/265 |
| 6,073,352 | A | * 6/2000 | Zykan et al. | 33/265 |
| 6,163,969 | A | * 12/2000 | Jan et al. | 33/286 |
| 6,247,237 | B1 | * 6/2001 | Redburn et al. | 33/265 |
| 6,347,457 | B1 | * 2/2002 | Espinoza et al. | 33/286 |
| 6,374,507 | B1 | * 4/2002 | Lehto | 33/286 |
| 6,494,604 | B1 | * 12/2002 | Khoshnood | 33/265 |
| 6,499,869 | B1 | * 12/2002 | Southworth | 33/264 |
| 2003/0019117 | A1 | * 1/2003 | Hoholik | 33/264 |

* cited by examiner

Primary Examiner—Diego Gutierrez
Assistant Examiner—Madeline Gonzalez
(74) Attorney, Agent, or Firm—Howard J. Greenwald P.C.; John M. Hammond (57) ABSTRACT

A tractor-trailer highway parameter gauge having visual indicators near the center of the field of view of an operator, which correlate with the location of the rearwardmost portion of the tractor-trailer within a traffic lane. The parameter gauge comprises a horizontally disposed base, a first electrically illuminated visual indicator mounted upon a first bracket assembly that is fastened to the base, a second electrically illuminated visual indicator mounted upon a second bracket assembly that is fastened to the base, an electrical component housing operatively connected to the first and said second visual indicators, and an electrical power supply connected to the electrical component housing. The parameter gauge enables safer operation of a tractor-trailer on a public highway.

38 Claims, 7 Drawing Sheets

HIGHWAY PARAMETER GAUGE FOR PRECISE OPERATION OF A TRACTOR-TRAILER

This invention relates in one embodiment to the operation of a powered vehicle towing an attached implement, and more particularly to a highway tractor towing an attached goods transportation trailer.

FIELD OF THE INVENTION

Visual indicators that are viewable within the field of view defined by a vehicle windshield, which provide an indication that the entire vehicle is properly aligned and maintained within a traffic lane during operation of the vehicle on a highway.

BACKGROUND OF THE INVENTION

The operation of a tractor-trailer upon public highways is a difficult and hazardous job. A considerable amount of skill and training is required to maintain such a wide and long vehicle within the boundaries of a highway lane for long periods of time, over a variety of weather and highway conditions. It is common for the rearwardmost portion of a tractor-trailer to deviate from the boundaries of a highway lane during operation, due to among other factors, the large amount of uncertainty inherent in knowing and controlling the location of such rearwardmost portion of such a long vehicle.

One key factor in maintaining a tractor-trailer within highway lane boundaries is the width of the vehicle. A standard trailer width is between 96 and 102 inches. Another key factor is the length of the trailer. Single box trailers, flatbed trailers, and tanker trailers disposed on a pair of rear axles typically have a length of between 45 and 53 feet, and may be as much as 57 feet in some states. However, on interstate highways, the operation of tandem trailers comprising two or three box trailers is a common practice. Such tandem tractor-trailer assemblies may be as long as 116 feet.

Although interstate highways have a federally mandated minimum lane width of 12 feet, it is common for state highways to be somewhat narrower, and municipal street lanes are almost always narrower. Thus the physical highway lane width is also a key factor in maintaining a tractor-trailer within highway lane boundaries.

In addition, adverse weather and lighting conditions play a significant role as well. In current practice, an operator will attempt to maintain the rear of his vehicle within the traffic lane using rear-view mirrors to observe its location. However, during operation in darkness, with headlight glare from following traffic, it is impossible to accurately make such an observation. In like manner, during adverse weather conditions such as rain or snow, such an observation is not possible due to turbulent mist, snow-obscured lane striping, etc.

Finally, the frequent observation of the rear of the vehicle presents a safety hazard, in that the operator's attention is diverted from the situation in front of the vehicle. The line of sight to a rear-view mirror is nearly perpendicular to the general line of sight forward, and given that each tractor is provided with a passenger side and a driver side mirror, the operator must spend an inordinate amount of time looking over approximately a 180 degree field of view, when his attention would be much more appropriately focused on a field of view of approximately 70 degrees, consisting of the highway and highway shoulders immediately in front of the vehicle. It is also known that the human eye has a greater density of receptor sites on the retina near the focal point of the lens, and that peripheral vision near the focal point of the lens is more rapidly and effectively processed by the brain. Thus, the less an operator relies upon wide-angle peripheral vision in the operation of a tractor-trailer, the better.

There is therefore a need for a reliable, adjustable, inexpensive apparatus, which can be used to indicate the location of the rearwardmost portion of a tractor-trailer, and which can be observed by the operator simultaneously with continued observation of the field of view immediately in front of the tractor trailer. Such a device preferably is retrofittable to existing tractor cabs, is visible during daytime or nighttime operation, and is adjustable to accommodate differences in trailer sizes, highway widths, operators, mounting locations within the tractor cab, and all other variables commonly occurring in the operation of a tractor-trailer. Such an apparatus will simplify and make safer the operation of a tractor-trailer, thereby reducing the stress and anxiety suffered by the operator, thereby making the operator more competent in the overall operation of the rig.

It is therefore an object of this invention to provide a tractor-trailer highway parameter gauge having visual indicators, which correlate with the location of the rearwardmost portion of the tractor-trailer within a traffic lane.

It is a further object of this invention to provide a tractor-trailer highway parameter gauge with visual indicators, which are visible to the operator within the field of view defined by the highway surface in front of the vehicle.

It is another object of this invention to provide a tractor-trailer highway parameter gauge with visual indicators, which are adjustable to accommodate variations in trailer width and highway lane width.

It is a yet another object of this invention to provide a tractor-trailer highway parameter gauge with visual indicators, which are adjustable to accommodate variations in operator height and seating position.

It is a further object of this invention to provide a tractor-trailer highway parameter gauge, which may be installed within the tractor cab.

It is a further object of this invention to provide a tractor-trailer highway parameter gauge, which may be easily installed upon the tractor dashboard, regardless of the angle and surface material of the dashboard.

It is an additional object of this invention to provide a highway parameter gauge, which may be utilized in the operation of car-trailer or light truck-trailer combinations, and which may be used in the operation of trucks having a widthwise-deployable apparatus such as a snowplow.

SUMMARY OF THE INVENTION

In accordance with the present invention, there is provided a tractor-trailer highway parameter gauge comprising a horizontally disposed base, a first electrically illuminated visual indicator mounted upon a first bracket assembly wherein said first bracket assembly is fastened to said base, a second electrically illuminated visual indicator mounted upon a second bracket assembly wherein said second bracket assembly is fastened to said base, an electrical component housing operatively connected to said first and said second visual indicators, and means for supplying electrical power to said electrical component housing.

In accordance with the present invention, there is provided a tractor-trailer highway parameter gauge comprising a horizontally disposed base, a first electrically illuminated visual indicator mounted upon a first bracket assembly wherein said first bracket assembly is fastened to said base, a second electrically illuminated visual indicator mounted upon a second bracket assembly wherein said second bracket assembly is fastened to said base, a third electrically illuminated visual indicator mounted upon a third bracket assembly, wherein said third bracket assembly is fastened to said base, a fourth electrically illuminated visual indicator mounted upon a fourth bracket assembly, wherein said fourth bracket assembly is fastened to said base, an electrical component housing operatively connected to said first, second, third, and fourth visual indicators, and means for supplying electrical power to said electrical component housing.

In accordance with the present invention, there is also provided a tractor-trailer highway parameter gauge comprising a horizontally disposed base, a first electrically illuminated visual indicator mounted upon a first bracket assembly wherein said first bracket assembly is fastened to said base, an electrical component housing operatively connected to said first visual indicator, and means for supplying electrical power to said electrical component housing.

The apparatus described above is advantageous because it provides for safer operation of a tractor-trailer upon public highways. The apparatus is flexible, in that it can be adapted to function with a range of tractor-trailers, highway conditions and operators. In addition, the apparatus of the present invention has utility in the operation of any powered vehicle towing an attached implement therebehind.

For example, the applicant's parameter gauge has utility in the operation of car-trailer and light truck trailer combinations. It is well known that in recent years, boats and recreational travel trailers sold in the United States have become considerably larger in size, having lengths up to about 35 feet. Unskilled operators routinely undertake the towing of such trailers with cars and light trucks, at considerable risk to themselves and other motorists.

The applicant's parameter gauge also has utility in the operation of a truck with a widthwise-deployable apparatus such as a snowplow. In such an operation, the wing plow portion of a snowplow may extend laterally from the side of the truck as much as about 12 feet. Presently, such operations are performed with the operator relying only upon experience, and intuition, or alternatively, the sound of objects being struck by the plow, in order to determine the location of the outermost tip of the plow.

The applicant's parameter gauge also has utility in the planting and cultivation of row crops, wherein a farm implement is towed behind a farm tractor. In numerous instances, the alignment of the rearward portion of the implement is critical in the particular cultivation operation, and such alignment is not visible from the operator's position on the tractor. The applicant's parameter gauge could be readily installed on the forward portion of the tractor, and used to improve the precision of the cultivation operation.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

Figure 1:
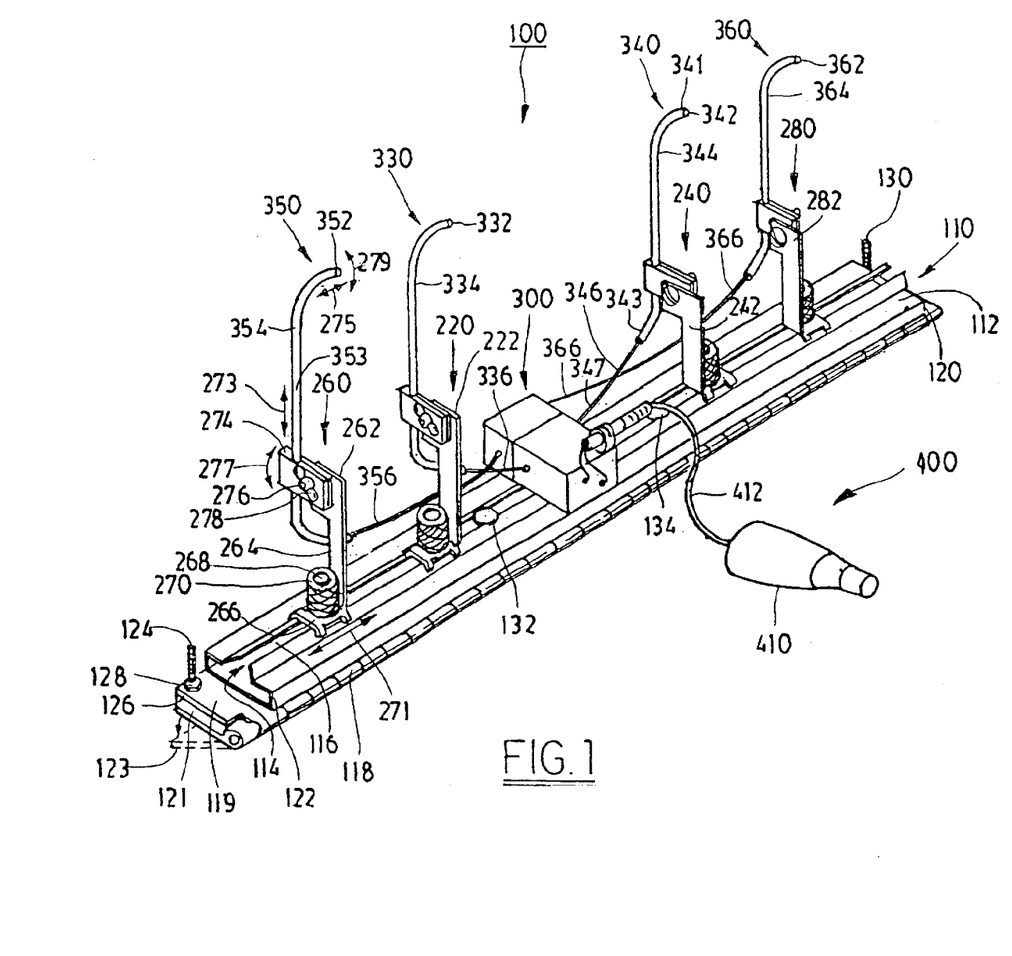
FIG. 1 is a perspective view of one preferred embodiment of the applicant's parameter gauge.

FIG. 1 is a perspective view of one preferred embodiment of the applicant's parameter gauge. Referring to FIG. 1, the preferred embodiment of applicant's parameter gauge 100 comprises a horizontally disposed base 110, a first electrically illuminated visual indicator 330 supported by a first bracket assembly 220, a second electrically illuminated visual indicator 340 supported by a second bracket assembly 240, a third electrically illuminated visual indicator 350 supported by a third bracket assembly 260, a fourth electrically illuminated visual indicator 360 supported by a fourth bracket assembly 280, an electrical component housing 300 operatively connected to visual indicators 330, 340, 350, and 360, and power supply means 400 comprising a power supply jack 410 connected to electrical component housing 300 by wiring 412.

In use, the applicant's parameter gauge provides visible light emitted from tips 332, 342, 352, and 362 of electrically illuminated visual indicators 330, 340, 350, and 360, respectively. The manner in which light is emitted from such tips will be explained subsequently. However, the manner in which a tractor-trailer operator uses the applicant's parameter gauge to more precisely maintain a tractor-trailer within a driving lane will be explained first.

Figure 3:
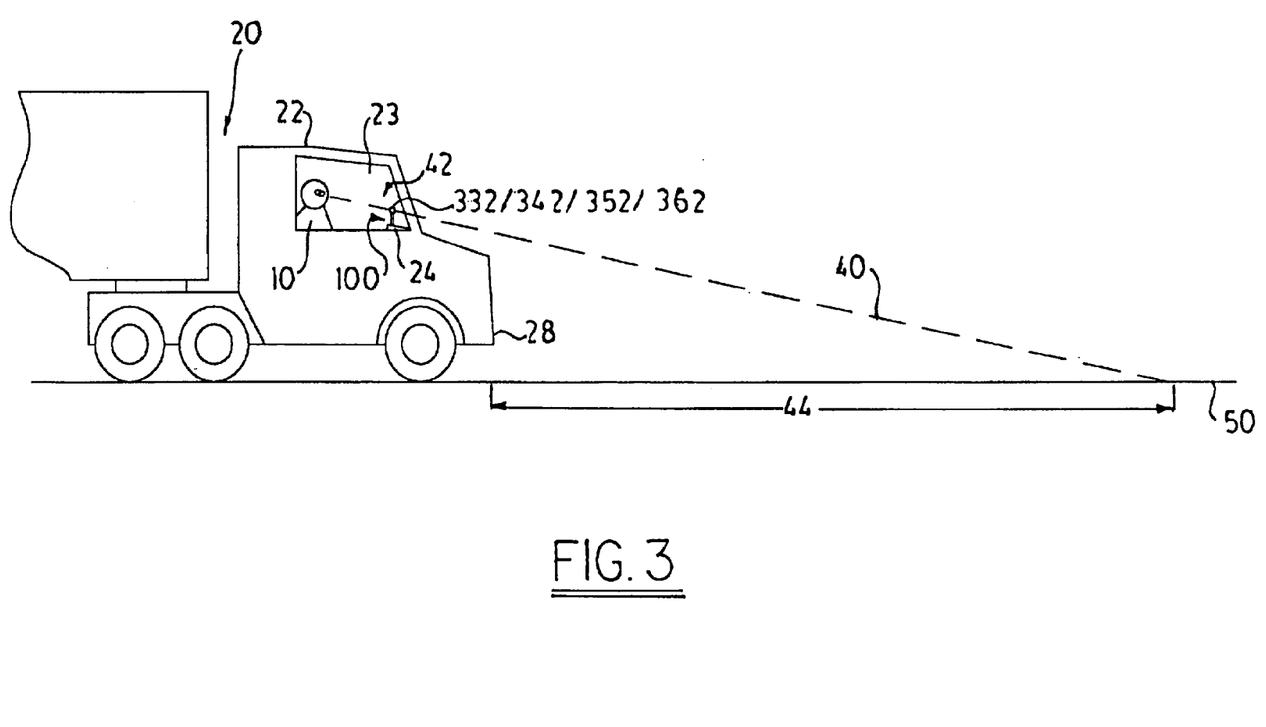
FIG. 3 is a side elevation view depicting the applicant's parameter gauge in use on a tractor-trailer.

FIG. 3 is a side elevation view depicting the applicant's parameter gauge in use on a tractor-trailer. Referring to FIG. 3, parameter gauge 100 is mounted upon tractor 22 of tractor-trailer 20. In the preferred embodiment, parameter gauge 100 is mounted within the cab 23 of tractor 22 upon dashboard 24. The operative requirement for the placement of parameter gauge 100 on tractor 22 is that a clear line of sight 40 is provided from the operator 10 past visual indicator illuminated tips 332, 342, 352, and 362 of parameter gauge 100 in the foreground 42 of operator's field of view, to the surface of the highway 50 at some distance 44 in front of tractor 20. The placement of parameter gauge 100 and the adjustment of visual indicator illuminated tips 332, 342, 352, and 362 thereof is such that distance 44 is preferably between 20 and 100 feet beyond the front 28 of tractor 22, and more preferably between 35 and 45 feet beyond the front 28 of tractor 22.

Figure 4:
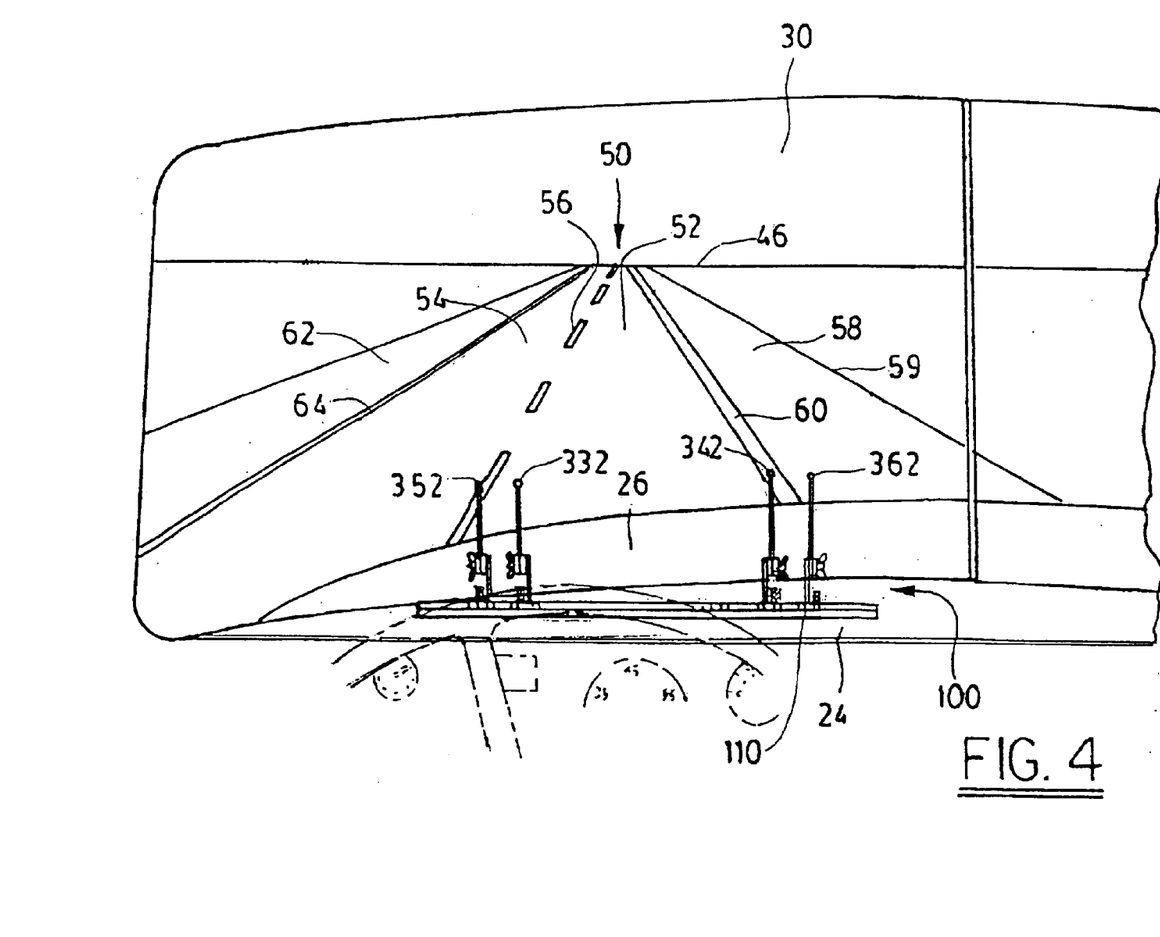
FIG. 4 is a perspective view of the applicant's parameter gauge in use on a tractor-trailer, taken from an operator's point of view through the windshield of the tractor-trailer, and depicting the tractor-trailer in proper location within a traffic lane.

FIG. 4 is a perspective view of the applicant's parameter gauge in use on a tractor-trailer, taken through the windshield of the tractor-trailer, and depicting the tractor-trailer in proper location within a traffic lane. Referring to FIG. 4, parameter gauge 100 is mounted on dashboard 24 of tractor 22 (see FIG. 3). The operator 10 (see FIG. 3) has a field of view of highway 50 extending from the leading edge of hood 26 to horizon 46, or to the extent that traffic (not shown) that is preceding the tractor-trailer will allow.

Highway 50 of FIG. 4 is depicted as a two-lane highway, and may be a typical one-way limited-access highway, or a typical two-way rural highway or urban street. For the sake of illustration, highway 50 of FIG. 4 comprises right lane 52, and left lane 54, separated by center lane marker 56. Highway 50 further comprises right shoulder 58 separated from right lane 52 by right edge stripe 60, and left shoulder 62 separated from left lane 54 by left edge stripe 64. For sake of illustration, the tractor-trailer is depicted as being operated within the right lane 52 of highway 50, which is typical of highways in the United States. It is to be understood that the use of applicant's parameter gauge is equally suited to both left-hand and right-hand drive vehicles and the corresponding highways upon which such vehicles are operated.

In the operation of the tractor-trailer, the operator has a line of sight 40 (see FIG. 3) across the visual indicating tips of parameter gauge 100 to the surface of highway 50. In one embodiment in which applicant's parameter gauge 100 comprises two visual indicating tips 332 and 342, the operator maintains tips 332 and 342 within lane 52 (see FIG. 4). In another embodiment in which applicant's parameter gauge 100 comprises one visual indicating tip 342, the operator maintains tip 342 upon right lane stripe 60. Alternatively, in a similar embodiment in which applicant's parameter gauge 100 comprises one visual indicating tip 352, the operator maintains tip 352 upon left lane stripe 60. In another embodiment in which applicant's parameter gauge 100 comprises three visual indicating tips 332, 342, and 362, the operator maintains tip 342 upon right lane stripe 60, and uses tips 332 and 362 as alarm indicators", which indicate if the tractor trailer has deviated into lane 54.

However, the preferred embodiment of applicant's parameter gauge 100 of FIG. 4, comprising four visual indicating tips, provides for a more precise operation of the tractor-trailer. Referring to FIG. 4, parameter gauge 100 comprises visual indicator illuminated tips 332, 342, 352, and 362, having an alignment with respect to the markings 56 and 60 on highway 50, when viewed along the operator's line of sight 40 (see FIG. 3). The exact choice of calibration and alignment of such visual indicator illuminated tips with respect to markings upon the highway in order for the operator to maintain the tractor-trailer within the lane may vary from operator to operator. In the ensuing description, a preferred method will be disclosed, with it being understood that small variations in the exact alignment of the visual indicator illuminated tips with respect to markings upon the highway may be preferred by other operators, and such parameter gauge setups are to be considered within the scope of the present invention. Such variations are to be considered a matter of preference of the operator, much as one hunter might sight in a rifle differently to hunt moving game than another hunter might.

In one preferred operation of the tractor-trailer, the operator maintains outer left visual indicator illuminated tip 352 aligned with center lane marker 56, and inner right visual indicator illuminated tip 342 aligned with right edge stripe 60. As the operator drives the tractor-trailer, he continuously maintains such precise alignment within lane 52 with brief glances downward to tips 352 and 342. Such downward glances by the operator are momentary, and deviate only slightly from the general field of view of highway 50 to horizon 46, as opposed to the operator turning his head and looking approximately 90 degrees left or right to the rear view mirrors (not shown) of the tractor trailer.

In the preferred operation, the operator has calibrated his parameter gauge such that the location of his line of sight past indicator 342 to the highway surface corresponds to the outer right edge of the trailer as traverses the highway. Thus when the operator maintains his line of sight past indicator 342 to right edge stripe 60, his trailer traverses the highway with its outer right edge (and outer right tires) tracking along edge stripe 60. Such is the way most operators prefer to drive, i.e. shading the right edge stripe, and leaving greater room for error (particularly by other motorists) on the center-line (left) side of the vehicle.

Figure 5:
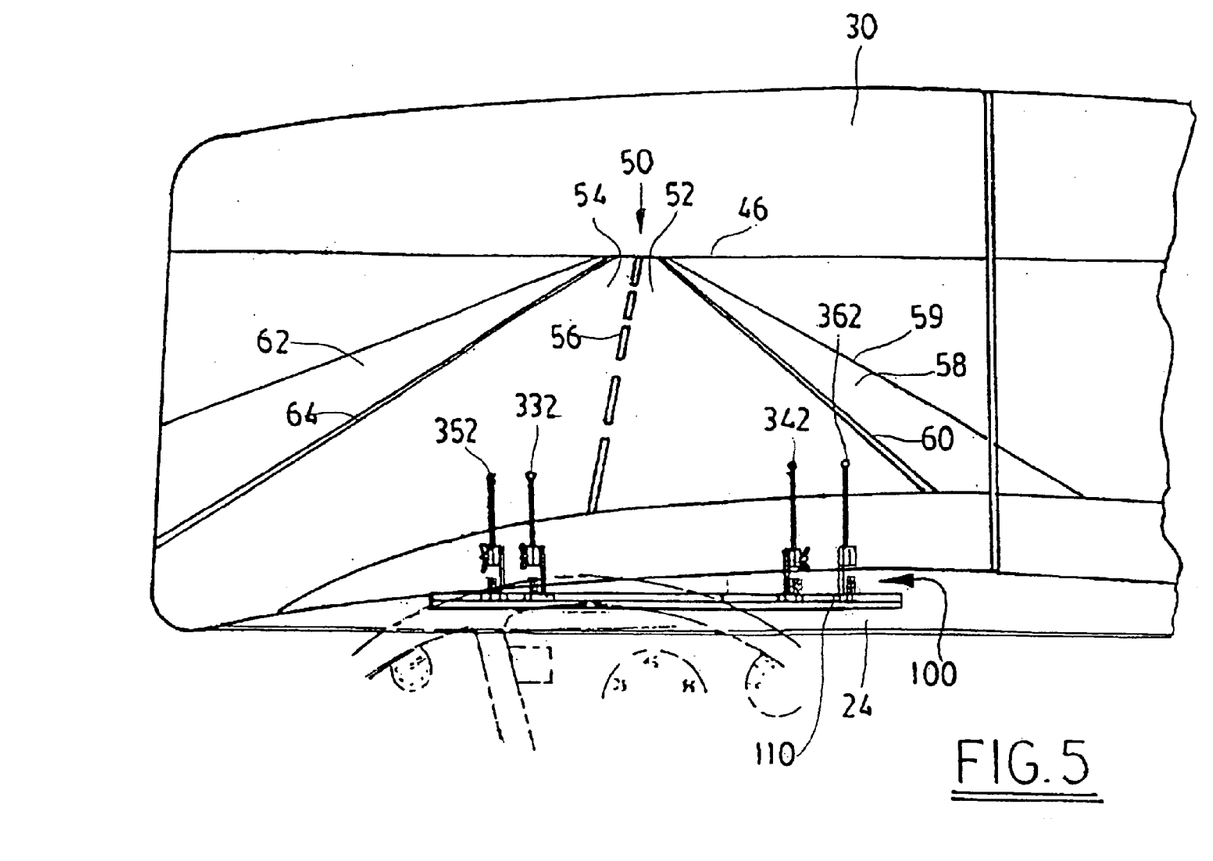
FIG. 5 is a perspective view of the applicant's parameter gauge in use on a tractor-trailer, taken from an operator's point of view through the windshield of the tractor-trailer, and depicting the tractor-trailer having deviated from proper location within a traffic lane.

FIG. 5 is a perspective view of the applicant's parameter gauge in use on a tractor-trailer, taken from an operator's point of view through the windshield of the tractor-trailer, and depicting the tractor-trailer having deviated from proper location within a traffic lane. Referring to FIG. 5, the tractor-trailer has clearly deviated from its desired location within lane 52, as indicated by center stripe 56 being located between tips 332 and 342.

Thus while it has been noted that the function of outer left tip 352 and inner right tip 342 is to indicate the most desired location of the tractor-trailer "shading the right side" of lane 52, the function of inner left tip 332 and outer right tip 362 are to indicate the maximum allowed deviation of the tractor trailer from the most desired location within lane 52. Typically, inner left tip 332 is positioned on base 110 of parameter gauge 100 such that inner left tip 332 indicates when tractor-trailer is encroaching into lane 54, and outer right tip 362 is positioned on base 110 of parameter gauge 100 such that outer right tip 362 indicates when tractor-trailer is encroaching too close to the edge 59 of shoulder 58. Therefore in the perspective view of FIG. 5 provided for the sake of illustration, it is clear that applicant's parameter gauge 100 is indicating that the tractor-trailer has deviated across center lane marker 56 into lane 54, and that in normal operation, the operator would make a correction well before such a condition occurred.

In the preferred embodiment of applicant's highway parameter gauge, to make outer illuminated visual indicators 350 and 360 more distinct from inner illuminated visual indicators 330 and 340, outer illuminated visual indicators 350 and 360 are provided in a different color than inner illuminated visual indicators 330 and 340. In one preferred embodiment, outer illuminated visual indicators 350 and 360 are provided in red, while inner illuminated visual indicators 330 and 340 are provided in green. The use of such different colors renders the parameter gauge easier to "read" with a momentary glance by the operator.

The applicant's highway parameter gauge also has utility to an operator in negotiating curves in highways, while maintaining the trailer within the traffic lane. This is among the more routine but challenging problems faced by a tractor-trailer operator. It is well known that a trailer, not having its own independent steering, will not follow the track of the towing tractor around a curve. Instead, the rear of the trailer will follow to the inside of a curve, i.e. along a smaller radius of curvature. When negotiating sharp curves, such as interstate exit ramps and interchanges, the radius of curvature of the track of the tractor is often on the order of four feet larger than the radius of curvature of the track of the rear of a typical 53-foot long trailer. In other words, the rear of the trailer tracks four feet or more to the inside of the tractor on the curve. In circumstances in which the exit ramp or interchange is a dual-lane structure with parallel or opposing vehicular traffic in the adjacent lane, this is obviously a dangerous situation for both vehicles, even if the curved lanes are provided with an expanded width.

To maintain the rear of a trailer within the traffic lane, the operator must drive the tractor "high" on the curve, i.e. along a larger radius of curvature. Often, the operator must drive the tractor at the outwardmost edge of the curved traffic lane, almost on the outer lane stripe. When operating on a significantly sharp curve, it is virtually impossible for the operator to see the rear of the trailer, because the rear view mirrors are set for viewing the trailer when traveling straight. In the inside mirror, the operator sees the side of the trailer at some area along its length. In the outside mirror, the operator sees none of the trailer at all. If the operator leans forward or backward or otherwise contorts his body, he may be able to see the rear of the trailer. This is also clearly an unsafe maneuver.

With some driving experience and road testing, however, the operator can learn to use the highway parameter gauge of the present invention as a means of negotiating a curve safely with the trailer maintained within the traffic lane. For example, on a gentle, sweeping curve to the right encountered on an interstate highway, the operator may determine from road testing in low-traffic conditions that if he operates the tractor with visual indicator 332 aligned with the center stripe 56 (if operating in the right lane), or the edge stripe 64 (if operating in the left lane), the rear of the trailer will follow exactly within the lane where he wants it to track. Similarly, the operator may determine that upon an exit ramp curving sharply to the right, if he operates the tractor with visual indicator 352 aligned a considerable distance outside of the lane, at the base of a guard rail, for example, the rear of the trailer will follow exactly within the lane where he wants it to track.

The operator does not need to concern himself with trying to see the rear of the trailer in his mirrors on the curve, because he knows where such trailer is by use of his parameter gauge. Thus the applicant's highway parameter gauge is an effective tool for an operator in negotiating curves in highways, while maintaining the trailer within the traffic lane.

As previously noted, the dimensions of highway lanes vary, with interstate highway lanes being widest, and highway lanes of state, county, and municipal jurisdictions often being narrower. Accordingly, in the preferred embodiment, applicant's highway parameter gauge is provided with means for adjusting the longitudinal position of the illuminated visual indicators mounted on the base thereof.

Referring again to FIG. 1, electrically illuminated visual indicators 330, 340, 350, and 360 are mounted upon bracket assemblies 220, 240, 260, and 280, respectively. Bracket assemblies 220, 240, 260, and 280 are adjustably fastened to base 110, such that the relative horizontal positions of visual indicators 330, 340, 350, and 360 along base 110 can be adjusted. Such adjustment provides proper alignment of the visual indicators with the borders of the particular highway lane upon which the tractor-trailer is being driven, with respect to the particular seating position of the operator.

In the following description, the adjustment capabilities of visual indicator 350 and bracket assembly 260 will be described. It is to be understood that in the preferred embodiment, visual indicators 330, 340, and 360 mounted upon bracket assemblies 220, 240, and 280 are substantially identical to visual indicator 350 mounted on bracket assembly 260, and are thus similarly adjustable.

Referring to FIG. 1, base 110 of the parameter gauge 100 comprises a rail 112. Rail 112 has an open interior, with a substantially T-shaped open cross section 114. Bracket assembly 260 comprises an L-shaped member 262 having an upright section 264 and a foot 266. Foot 266 is provided with a hole therethrough, and fastened to rail 112, preferably by threaded fastening means.

In one preferred embodiment, such threaded fastening means comprises a screw 268, the head of which is engaged within T-shaped cross section 114 of rail 112, and the threaded shank of which extends upwardly through T-slot 116 of rail 112, and through the hole (not shown) in foot 266 of L-shaped member 262. Nut 270 is threadedly engaged with screw 268, such that when nut 270 is fully tightened, foot 266 of L-shaped member 262 is fastened to rail 112 of base 110.

In one preferred embodiment, rail 112 was fabricated from an aluminum extrusion having a wall thickness of 0.040 inches, and a T-shaped cross section approximately 1.25 inches wide and 0.25 inches high. Screw 268 was a T-screw having a head approximately one inch wide and 0.125 inch thick, and ¼—20 UNC threads. Nut 270 was a ¼—20 UNC knurled nut, enabling easy adjustment of the bracket assembly without the use of hand tools.

To adjust the horizontal position of visual indicator 350 and bracket assembly 260 on base 110, the operator (not shown) simply loosens nut 270 on screw 268 sufficiently such that visual indicator 350 and bracket assembly 260 are slidable on rail 112, as indicated by arrow 271. The operator positions visual indicator 350 and bracket assembly 260 in the desired horizontal position on rail 112, and retightens nut 270 on screw 268.

The operator likewise adjusts the horizontal positions of visual indicators 330, 340, and 360 mounted upon bracket assemblies 220, 240, and 280. The parameter gauge is preferably set up with the assistance of a professional who has prior experience and knowledge of the setup of such gauge. However, the setup of the applicant's parameter gauge is sufficiently simple as to enable a first time user to perform such setup, according to directions and a setup kit (not shown) provided with the gauge. The following description is applicable to the use of the applicant's parameter gauge when operating the tractor-trailer on a 12 foot wide lane. It is to be understood that slight variations in the set up procedure may be necessary to accommodate traffic lanes of different width.

To perform a first-time setup of the parameter gauge, the operator preferably places his tractor in a marked area not frequented by traffic. The operator must be operating the tractor in a straight line while it is being parked. The operator exits the tractor-trailer and then attaches one end of a spool of marking tape to an outer rear edge of a rear mud flap of the tractor, and proceeds to unwind the tape tangent to the outer edge of the rear tire (or tires, if a tandem axle tractor is in use), going forward past the front bumper of the tractor approximately 40 feet. (The exact distance may be a matter of preference to the operator.) The operator places the tape on the highway surface in a line of sight aligned with the distant edges of the tires of the tractor, and applies a weight to hold the tape in place if the adhesive is not sufficient to retain it in place upon the pavement.

The operator runs the tape at a 90 degree angle to the right a distance of between about 20 and 22 inches, and more preferably 21 inches, taken from the perspective of the forward direction of the tractor. The operator then runs the tape again to the right, back toward the tractor approximately 10 feet parallel with the original length of tape previously applied.

The operator then repeats the process for the opposite side of the tractor. The marking of the pavement to setup the parameter gauge is then complete. The operator places his parameter gauge on the dashboard, and adjusts the positions of the visual indicators using the adjustment means previously described. The operator adjusts visual indicator 332 so that it is in alignment with the left inner tape strip, visual indicator 352 so that it is in alignment with left outer tape strip, visual indicator 342 so that it is in alignment with right inner tape strip, and visual indicator 362 so that it is in alignment with right outer tape strip.

The operator then makes temporary surrogate marking upon the windshield of the vehicle, removes the adhesive backing from the hook and loop strips on the base of the parameter gauge, and places the parameter gauge upon the dashboard, such that the adhesive bonds the base of the gauge to the dashboard, and such that the proper alignment of the indicators is maintained, based upon the temporary makings on the windshield. It is to be understood that fastening means other than hook and loop fastening means may be used to secure the parameter gauge to the dashboard.

Figure 7:
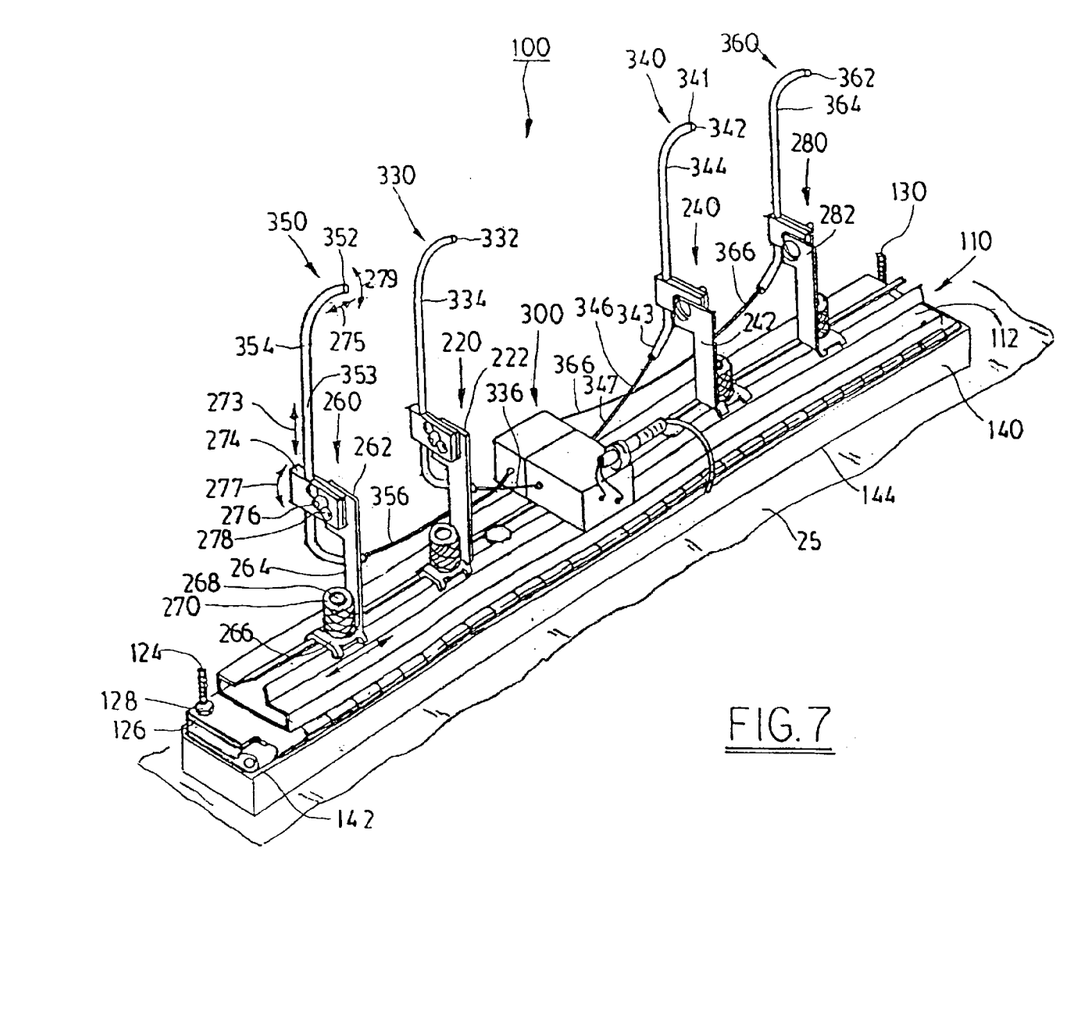
FIG. 7 is a perspective view of further embodiment of applicant's parameter gauge further comprised of an arctuate base adapter.

In a further embodiment depicted in FIG. 7, applicant's parameter gauge is provided with an arctuate base adapter, which enables the parameter gauge to be mounted upon a curved or otherwise irregularly shaped dashboard of a vehicle. Referring to FIG. 7, base 110 is disposed upon and fastened to upper flat surface 142 of base adapter 140. Base adapter 140 comprises a curved lower surface 144, which is formed to match the curved upper surface 25 of dashboard 24 of the tractor. In use, base adapter 140 is fastened to the curved upper surface 25 of dashboard 24, thereby placing applicant's parameter gauge in the vehicle in the desired stable and substantially horizontal position. Base adapter 140 may be joined to dashboard 24, and base 110 may be joined to base adapter 140 by suitable fastening means (not shown), e.g. adhesive, threaded fasteners, hook and loop, and the like.

Base adapter 140 may be formed out of any suitable structural material, such as sheet metal or plastic. In one embodiment, base adapter 140 is made of wood, or of a rigid closed cell foam material, either of which may easily be custom trimmed by hand to form a lower surface 144 that matches the contour of the curved surface 25 of dashboard 24.

The applicant's parameter gauge is provided with further adjustment capabilities to properly accommodate operators of different height and seating positions and also to accommodate variations between trailers attached to the tractor. Referring again to FIG. 1, visual indicator 350 comprises a wrought tube 354 having at the upper end thereof indicator illuminated tip 352. Wrought tube 354 is engaged within and held by split clamp 274, which is fastened to L-shaped member 262 by screw 276 threadedly engaged with knurled nut 278. Thus visual indicator 350 is fastened to bracket assembly 260 and immobilized therein when knurled nut 278 is fully tightened on screw 276, thereby engaging split clamp 274 with wrought tube 354.

However, when knurled nut 278 is slightly loosened on screw 276, several additional modes of adjustment of the position of visual indicator 350 are provided. Wrought tube 354 is vertically slidable in split clamp 274 as indicated by arrow 273, thereby enabling the adjustment of the height of indicator illuminated tip 352. Wrought tube 354 is also rotatable in split clamp 274, thereby enabling the adjustment of the approximately horizontal aim of indicator illuminated tip 352 as indicated by arrow 275. Split clamp 274 is rotatable upon L-shaped member 262 around screw 276 as indicated by arctuate arrow 277 thereby enabling the adjustment of the approximately vertical aim of indicator illuminated tip 352 as indicated by arctuate arrow 279.

Thus it will be apparent that an operator has complete adjustability of the positions of visual indicators 330, 340, 350, and 360 to properly accommodate his particular height and driving position, as well as the particular traffic lane upon which he will be driving. In a further embodiment, visual indicator 350 is provided with graduation marks upon rail 112 near arrow 271 and upon wrought tube 354 near arrow 273, in order to enable simple repeatable setup of visual indicator 350 for a particular operator and lane width. In like manner visual indicators 330, 340, and 360 are also provided with corresponding graduation marks so that the entire parameter gauge 100 can be easily set up by a particular operator for a particular lane width and trailer in tow.

The specific sizes of certain components can be varied to accommodate the vast majority of variation required in the adjustability of the positions of visual indicators 330, 340, 350, and 360, due to variations in driver height, driver seating position, dashboard position and slope, and height of the vehicle (in particular the driver's seat thereof) above the road surface. It will be apparent that there is a substantial difference in the driver's view out of the windshield of a tractor-trailer as depicted in FIGS. 4 and 5, and out of the windshield of a passenger car towing a recreational trailer. In fact, in the latter instance, the tongue weight of the trailer often loads the rear suspension of the passenger car, changing the lengthwise angle of the vehicle frame as such vehicle tows the trailer.

To accommodate such wide variability, and enable the adjustment of the positions of visual indicators 330, 340, 350, and 360 in the proper line of sight 40 (see FIG. 3) from the driver's eyes to the highway, the sizes of two key components are preferably varied. Referring to FIG. 1, the height of upright section 264 of L-shaped bracket member 262, and the height of the substantially vertical straight section 353 of wrought tube 354 are varied. In like manner, the heights of L-shaped bracket members 222, 242, and 282 are varied, and the heights of wrought tubes 334, 344, and 364 are varied.

The applicant has determined that making the present invention with L-shaped bracket members having a height of between about 1 and about 3½ inches, and wrought tubes with straight sections of between about 1 and about 5½ inches provides sufficient adjustability in the positions of visual indicators 330, 340, 350, and 360 to accommodate the majority of situations previously described. In one instance of a passenger car towing a recreational trailer, such passenger car being relatively close to the ground with a low bench seat, L-shaped brackets having a height of about one inch and wrought tubes with straight sections of about 1 inch may be used. In contrast, a full-sized tractor trailer with a low dashboard, and a tall operator's seat may require L-shaped brackets having a height of about 3 inches and wrought tubes with straight sections of about 5 inches.

In a further embodiment, applicant's parameter gauge is provided with additional adjustability to accommodate the variation in dashboard slopes of various tractors. Referring to FIG. 3, dashboard 24 of tractor 22 typically has a top surface that is either substantially level, or sloping toward hood 26 of tractor 22. The angle of slope varies widely from tractor to tractor, and may be between zero and 45 degrees from level. Thus it is desirable to provide a parameter gauge with a base that can accommodate such variation.

Referring to FIG. 1, in the preferred embodiment, base 110 of parameter gauge 100 further comprises a hinge 118 upon which rail 112 is fastened. In the embodiment depicted in FIG. 1, hinge 118 is approximately the same length as rail 112, but in other embodiments, a plurality of short hinges may be fastened to rail 112. In the preferred embodiment, hinge 118 (or the hinges furthest distant from each other) extends out slightly beyond the opposite ends 120 and 122 of rail 112. A setscrew 124 is installed in a threaded hole proximate to the corner 126 of the upper half 119 of hinge 118, and a locknut 128 is threadedly engaged with setscrew 124.

When setscrew 124 is screwed inwardly, extending through upper half 119 of hinge 118, the tip (not shown) of setscrew 124 pushes against the lower half 121 of hinge 118, thereby varying the angle between upper half 119 and lower half 121 of hinge 118, as indicated by lower half 123 shown in dotted line format. When applicant's parameter gauge is installed on the dashboard 24 of the tractor (see FIG. 3), rail 112 may fastened to the upper half 119 of hinge 118 by suitable means such as, e.g. threaded fasteners (not shown). In the preferred embodiment, rail 112 is held in place by locating buttons 132 and 134, such locating buttons being engaged with precisely drilled holes in rail 112 so that rail 112 is held fast on upper half 119 of hinge 118. The use of locating buttons enables the easy removal of the rail and indicator assembly, and the subsequent precise relocation of such assembly upon the base.

Referring again to FIG. 1, lower half 121 of hinge 118 is fastened to the dashboard surface by suitable fastening means, e.g., double sided adhesive tape, hook and loop fastener, threaded fasteners, and the like. Thus, by screwing setscrew 124 and similar setscrew 130 disposed at the opposite corner of hinge 118 inwardly or outwardly, the angle of a particular dashboard can be accommodated, such that applicant's parameter gauge 100 is mounted in a substantially level position within the cab 23 (see FIG. 3) of the tractor 22.

In use, applicant's highway parameter gauge is easily viewed, and the indications of optimal lane position and maximum allowed in-lane deviation thereof easily comprehended due to the use of electrically illuminated visual indicators. While it would be possible to utilize simple non-illuminated rods as visual indicators, such non-illuminated indicators would be difficult to see when driving at night, or when driving into oblique sunlight. In contrast, the electrically illuminated visual indicators of the preferred embodiment of applicant's highway parameter gauge are easy to see in all driving conditions, and easy to interpret, particularly when separate colors are used to denote optimal lane position and maximum allowed in-lane deviation.

Figures 2A, 2B:
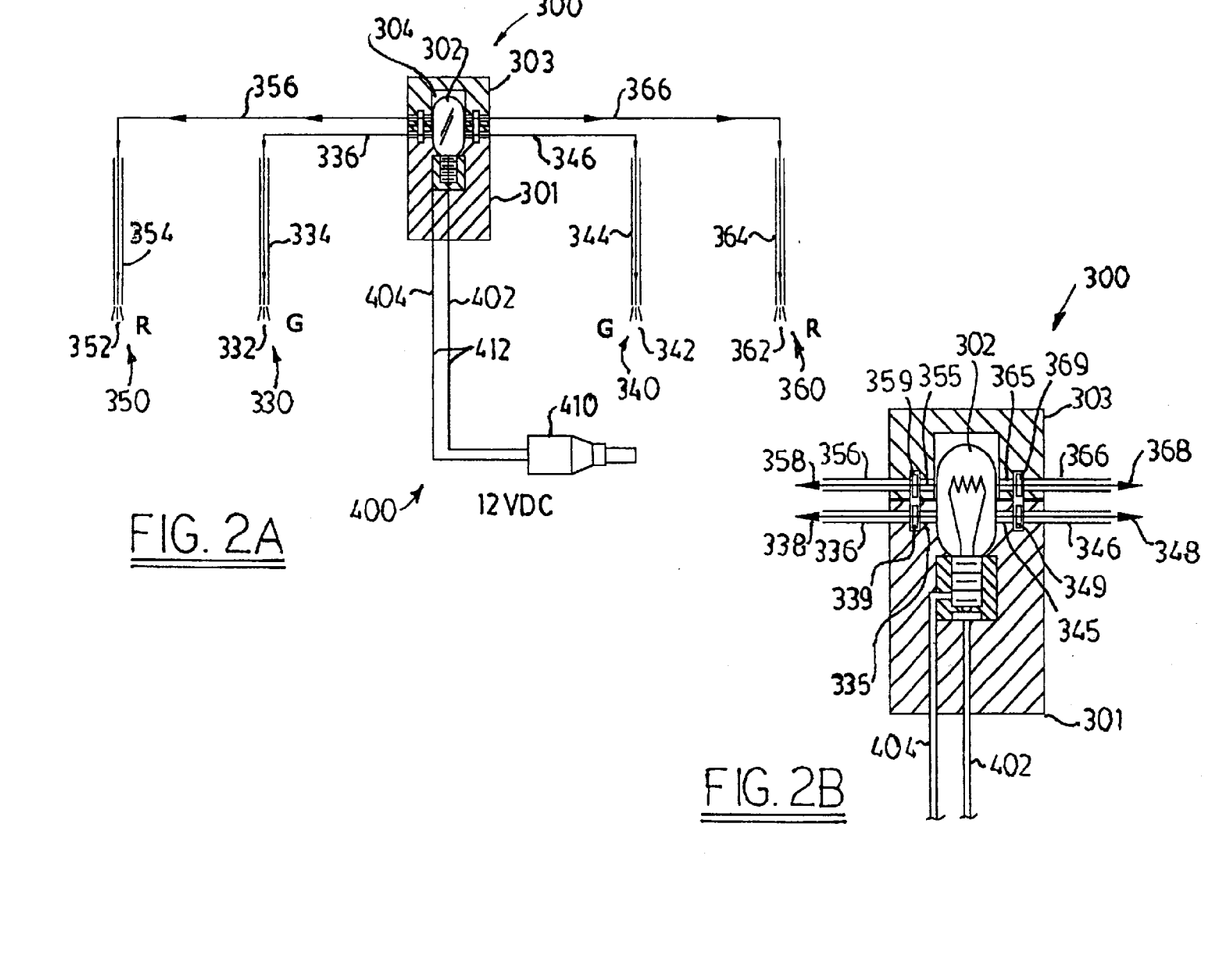
FIG. 2A is a schematic diagram of one preferred embodiment of the electrically illuminated visual indicators for determining proper location of the tractor-trailer within a traffic lane.
FIG. 2B is a detailed cross sectional view of one preferred electrical component housing and electrical light source for the illuminated visual indicators of the applicant's parameter gauge.

FIG. 2A is a schematic diagram of one preferred embodiment of the electrically illuminated visual indicators of the applicant's parameter gauge, and FIG. 2B is a detailed cross sectional view of one preferred electrical light source for the illuminated visual indicators of the applicant's parameter gauge. FIGS. 2A and 2B, along with FIG. 1, provide details of the structure and function of one embodiment of such electrically illuminated visual indicators. In the following description, the structure of electrically illuminated visual indicator 340 will be described in the most detail. It is to be understood that in the preferred embodiment, visual indicators 330, 350, and 360 mounted upon bracket assemblies 220, 260, and 280 are substantially identical to visual indicator 340 mounted on bracket assembly 240.

Referring to FIG. 1, electrically illuminated visual indicator 340 comprises wrought tube 344, which houses optical fiber 346. In the preferred embodiment, optical fiber 346 channels light that is generated from within electrical component housing 300 to the tip 342 of visual indicator 340. (The structure and function of electrical component housing 300 is to be described subsequently.) In this embodiment, in which visual indicator 340 comprises optical fiber 346, the indicator illuminated tip 342 of visual indicator 340 is simply the terminated end of optical fiber 346, which is proximate to the upper end 341 of wrought tube 344.

Tube 346 is preferably fabricated of a pliable material, such as e.g., thin walled steel tubing. Thus when applicant's parameter gauge 100 is fabricated and assembled, tube 344 is wrought into a shape such that the tip 342 at the upper end of optical fiber 346 disposed in tube 344 is aimed in the general direction of the operator of the tractor-trailer. Accordingly, the operator is able to clearly see the light channeled through optical fiber 344. Because optical fiber 346 is flexible, the precise aim of optical fiber 346 may be finely adjusted during setup of the parameter gauge 100 by a particular operator, to provide the desired level of brightness of the light directed thereto. In addition, the lower end 343 of tube 344 is wrought such that the lower end 347 of fiber optic 346 is directed toward electrical component housing 300.

In like manner, electrically illuminated visual indicator 330 comprises optical fiber 336 disposed within and directed by wrought tube 334, electrically illuminated visual indicator 350 comprises optical fiber 356 disposed within and directed by wrought tube 354, and electrically illuminated visual indicator 360 comprises optical fiber 366 disposed within and directed by wrought tube 364.

In the preferred embodiment in which the electrically illuminated visual indicators 330, 340, 350, and 360 comprise optical fibers 336, 346, 356, and 366 respectively, electrical component housing 300 houses a light source, the light from which is channeled through such optical fibers to tips 332, 342, 352, and 362, where such light may be seen by the operator of the tractor-trailer. FIG. 2A is a schematic diagram of one preferred embodiment of the electrically illuminated visual indicators and the light source of the applicant's parameter gauge, and FIG. 2B is a detailed cross sectional view of one preferred electrical light source for the illuminated visual indicators of the applicant's parameter gauge.

Referring to FIG. 2A, electrical component housing 300 houses a light source 302 within cavity 304. Light source 302 is preferably an incandescent light bulb which emits broad-spectrum white light having a distribution of wavelengths between 400 nanometers and 700 nanometers, and which can be powered by 12 volts direct current. Electrical component housing 300 is preferably a two-piece housing, comprising a first piece 301, and a second piece 303, which are joined together by common fastening means (not shown) such as e.g., screws. Such a two-piece construction enables ease of fabrication and access to the components disposed within housing 300.

Within housing 300, light source 302 is electrically connected to power supply means 400, which provides electrical energy to illuminate light source 302. In one embodiment, power supply means comprises wiring 412 comprised of wires 402 and 404 connected at their terminal ends to the power terminals of light source 302, and at their opposite ends to power supply jack 410. In the preferred embodiment, power supply jack 410 is a common automotive jack that plugs into a cigarette lighter receptacle, which in turn is powered by the 12-volt battery of the tractor.

In another embodiment (not shown) wiring 412 is connected to a small auxiliary low voltage battery carried within the tractor. In a further embodiment (not shown), an electric switch is disposed in the wiring 412, enabling light source 302 to be easily turned on and off. Such a switch is preferably located in a convenient position on the dashboard of the tractor. Light emitted from light source 302 is provided to electrically illuminated visual indicators 330, 340, 350, and 360. Referring to FIG. 2B, light from light source 302 is emanated into ports 335, 345, 355, and 365, which are disposed within housing 300 between cavity 304 and the outer surface of housing 300. Optical fibers 336, 346, 356, and 366 are fitted snugly into ports 335, 345, 355, and 365, such that the light emanated from light source 302 is channeled into such optical fibers, as indicated by arrows 338, 348, 358, and 368. Such light is subsequently emitted at tips 332, 342, 352, and 362 of visual indicators 330, 340, 350, and 360, respectively.

As previously described, in the preferred embodiment of applicant's highway parameter gauge, outer illuminated visual indicators 350 and 360 have a different function than inner illuminated visual indicators 330 and 340. Thus outer illuminated visual indicators 350 and 360 are preferably provided in a different color than inner illuminated visual indicators 330 and 340. In one preferred embodiment, outer illuminated visual indicators 350 and 360 are provided in red, while inner illuminated visual indicators 330 and 340 are provided in green, as depicted in FIGS. 2B and 2A.

Referring to FIGS. 2B and 2A, red filter 359 is disposed within housing 300 in the path of light (arrow 358) directed to indicator 350, and red filter 369 is disposed within housing 300 in the path of light (arrow 368) directed to indicator 360. Indicators 350 and 360 provide indication of optimum position of the tractor-trailer within the lane, as described previously. Referring again to FIGS. 2B and 2A, green filter 339 is disposed within housing 300 in the path of light (arrow 338) directed to indicator 330, and green filter 349 is disposed within housing 300 in the path of light (arrow 348) directed to indicator 340. Indicators 330 and 340 provide indication of maximum allowed deviation of the tractor trailer within the lane, as described previously.

In the preferred embodiment, filters 359 and 369 are small pieces of substantially clear red tinted plastic film, which are inexpensive and simple to fabricate. In like manner, filters 339 and 349 are small pieces of substantially clear green tinted plastic film.

Although the preferred embodiment of electrical component housing 300 has been described as comprising a light source that emanates light into electrically illuminated visual indicators 330, 340, 350, and 360, other configurations of electrical component housing 300 and electrically illuminated visual indicators 330, 340, 350, and 360 are comprehended and are within the scope of the present invention.

In another embodiment, electrical component housing 300 comprises an electrical terminal strip (not shown), providing electrical power to four pairs of electrical terminals (not shown). Referring to FIGS. 1 and 2A, disposed at the tip 352 of electrically illuminated visual indicator 350 is a red light-emitting diode (not shown). The positive and negative wires (not shown) from such diode are disposed within wrought tube 354, and routed into electrical component housing 300, in much the same manner as described for optical fiber 356 of FIG. 1. Such wires are terminated within housing 300 at a pair of terminals (not shown), so that when 12 volts direct current is provided by power supply means 400 to the terminal strip within housing 300, the red light emitting diode disposed at tip 352 of visual indicator 350 is illuminated, and is visible to the operator of the tractor-trailer.

In like manner, a second red light-emitting diode is disposed at the tip 362 of electrically illuminated visual indicator 360, and the wiring of such diode is terminated at the terminal strip within housing 300. Thus electrically illuminated visual indicators 350 and 360, comprising red light-emitting diodes, provide indication of optimum position of the tractor-trailer within the lane, in substantially the same manner as described previously.

Also in like manner, a first green light-emitting diode is disposed at the tip 332 of electrically illuminated visual indicator 330, and the wiring of such diode is terminated at the terminal strip within housing 300. A second green light-emitting diode is disposed at the tip 342 of electrically illuminated visual indicator 340, and the wiring of such diode is terminated at the terminal strip within housing 300. Thus electrically illuminated visual indicators 330 and 340, comprising green light-emitting diodes, provide indication of maximum allowed deviation of the tractor trailer within the lane, in substantially the same manner as described previously.

Figure 6:
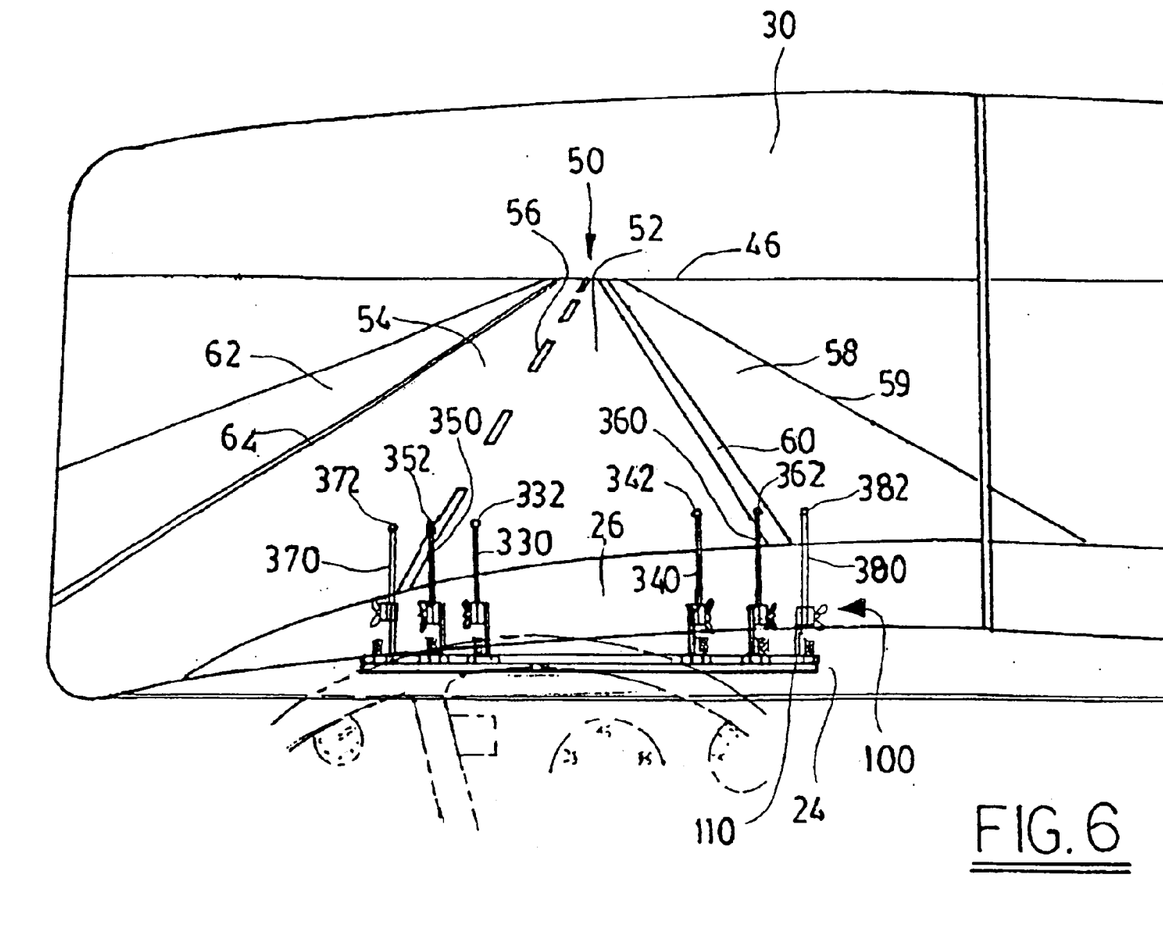
FIG. 6 is a perspective view of a further embodiment of applicant's parameter gauge in use on a tractor-trailer, in which said embodiment is used in the towing of a "WIDE LOAD" trailer.

In yet a further embodiment depicted in FIG. 6, applicant's highway parameter gauge further comprises a fifth electrically illuminated visual indicator and a sixth electrically illuminated visual indicator disposed upon base 110. Such a configuration is useful when the tractor is coupled to a "WIDE LOAD", as defined by various federal, state, and/or local statutes. A wide load may comprise a mobile home, a large piece of industrial equipment, a structural assembly, and the like.

Rather than disturb the setup of visual indicators 330, 340, 350, and 360, it is preferable that applicant's highway parameter gauge is provided with a fifth visual indicator 370, the position of which is set to indicate the location in the highway of the left side of the WIDE LOAD, and a sixth visual indicator 380, the position of which is set to indicate the location in the highway of the right side of the WIDE LOAD. Thus this embodiment of applicant's highway parameter gauge enables the tractor to easily switch between conventional trailers and WIDE LOAD trailers with little or no adjustment thereof.

It will be readily apparent that in such an embodiment, applicant's highway parameter gauge further comprises an electrical component housing which enables the lighting of the tips 372 and 382 of said fifth and sixth 370 and 380, in substantially the same manner as previously described for electrically illuminated visual indicators 330, 340, 350, and 360. Tips 372 and 382 are preferably provided in a different color than the tips of visual indicators 330, 340, 350, and 360, such as, e.g. yellow, or blue.

It is, therefore, apparent that there has been provided, in accordance with the present invention, a highway parameter gauge for precise operation of tractor-trailer. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A tractor-trailer highway parameter gauge comprising
   (a) a horizontally disposed base comprising an upper surface, and a rail fastened to said upper surface, said rail comprising an open cross-section defined by a horizontally disposed bottom side, a vertically disposed proximal side extending upwardly from a proximal end of said horizontally disposed bottom side, a vertically disposed distal side extending upwardly from a distal end of said horizontally disposed bottom side, a horizontally disposed proximal upper side extending horizontally from an upper end of said vertically disposed proximal side, and a horizontally disposed distal upper side extending horizontally from an upper end of said vertically disposed distal side;
   (b) a first electrically illuminated visual indicator mounted upon a first bracket assembly, wherein said first bracket assembly is fastened to said rail;
   (c) a second electrically illuminated visual indicator mounted upon a second bracket assembly, wherein said second bracket assembly is fastened to said rail;
   (d) an electrical component housing operatively connected to said first and said second visual indicators; and
   (e) means for supplying electrical power to said electrical component housing.

2. The tractor-trailer highway parameter gauge as recited in claim 1 wherein said first visual indicator comprises a first optical fiber disposed within a first wrought tube, and said second visual indicator comprises a second optical fiber disposed within a second wrought tube.

3. The tractor-trailer highway parameter gauge as recited in claim 2, wherein said first optical fiber comprises an illuminated tip disposed at the upper end of said first wrought tube, and said second optical fiber comprises an illuminated tip disposed at the upper end of said second wrought tube.

4. The tractor-trailer highway parameter gauge as recited in claim 3, wherein said first optical fiber comprises an end disposed within a first port in said electrical component housing, and said second optical fiber comprises an end disposed within a second port in said electrical component housing.

5. The tractor-trailer highway parameter gauge as recited in claim 4, wherein an electrical light source is housed within said electrical component housing, and wherein light from said electrical light source is emanated through said first port into said first optical fiber and through said second port into said second optical fiber.

6. The tractor-trailer highway parameter gauge as recited in claim 1, wherein said first bracket assembly comprises a first L-shaped member comprising a foot fastened to said rail and said second bracket assembly comprises a second L-shaped member comprising a foot fastened to said rail.

7. The tractor-trailer highway parameter gauge as recited in claim 6, wherein said foot of said first L-shaped member is fastened to said rail by a first threaded fastener engaged within said open cross section of said rail, and wherein said foot of said second L-shaped member is fastened to said rail by a second threaded fastener engaged within said open cross section of said rail, and wherein the positions of said first L-shaped member and said second L-shaped member are adjustable along the length of said rail.

8. The tractor-trailer highway parameter gauge as recited in claim 1, further comprising a third electrically illuminated visual indicator mounted upon a third bracket assembly, wherein said third bracket assembly is fastened to said rail, and a fourth electrically illuminated visual indicator mounted upon a fourth bracket assembly, wherein said fourth bracket assembly is fastened to said rail.

9. The tractor-trailer highway parameter gauge as recited in claim 8 wherein said first visual indicator comprises a first optical fiber disposed within a first wrought tube, said second visual indicator comprises a second optical fiber disposed within a second wrought tube, said third visual indicator comprises a third optical fiber disposed within a third wrought tube, and said fourth visual indicator comprises a fourth optical fiber disposed within a fourth wrought tube.

10. The tractor-trailer highway parameter gauge as recited in claim 9, wherein said first optical fiber comprises an illuminated tip disposed at the upper end of said first wrought tube, said second optical fiber comprises an illuminated tip disposed at the upper end of said second wrought tube; said third optical fiber comprises an illuminated tip disposed at the upper end of said third wrought tube, and said fourth optical fiber comprises an illuminated tip disposed at the upper end of said fourth wrought tube.

11. The tractor-trailer highway parameter gauge as recited in claim 10, wherein said first optical fiber comprises an end disposed within a first port in said electrical component housing, and said second optical fiber comprises an end disposed within a second port in said electrical component housing, said third optical fiber comprises an end disposed within a third port in said electrical component housing, and said fourth optical fiber comprises an end disposed within a fourth port in said electrical component housing.

12. The tractor-trailer highway parameter gauge as recited in claim 11, wherein a light source is housed within said electrical component housing, and wherein light from said light source is emanated through said first port into said first optical fiber, and through said second port into said second optical fiber, and through said third port into said third optical fiber, and through said fourth port into said fourth optical fiber.

13. The tractor-trailer highway parameter gauge as recited in claim 8, further comprising a fifth electrically illuminated visual indicator mounted upon a fifth bracket assembly, wherein said fifth bracket assembly is fastened to said rail, and a sixth electrically illuminated visual indicator mounted upon a sixth bracket assembly, wherein said sixth bracket assembly is fastened to said rail.

14. The tractor-trailer highway parameter gauge as recited in claim 1, wherein said first electrically illuminated visual indicator comprises a first light-emitting diode electrically connected to said means for supplying power, and said second electrically illuminated visual indicator comprises a second light-emitting diode electrically connected to said means for supplying power.

15. A tractor-trailer highway parameter gauge comprising
   (a) a horizontally disposed base comprising an upper surface, and a rail fastened to said upper surface, said rail comprising an open cross-section defined by a horizontally disposed bottom side, a vertically disposed proximal side extending upwardly from a proximal end of said horizontally disposed bottom side, a vertically disposed distal side extending upwardly from a distal end of said horizontally disposed bottom side, a horizontally disposed proximal upper side extending horizontally from an upper end of said vertically disposed proximal side, and a horizontally disposed distal upper side extending horizontally from an upper end of said vertically disposed distal side;

(b) a first electrically illuminated visual indicator mounted upon a first bracket assembly, wherein said first bracket assembly is fastened to said rail;

(c) a second electrically illuminated visual indicator mounted upon a second bracket assembly, wherein said second bracket assembly is fastened to said rail;

(d) a third electrically illuminated visual indicator mounted upon a third bracket assembly, wherein said third bracket assembly is fastened to said rail;

(e) a fourth electrically illuminated visual indicator mounted upon a fourth bracket assembly, wherein said fourth bracket assembly is fastened to said rail;

(f) an electrical component housing operatively connected to said first and said second visual indicators; and (g) means for supplying electrical power to said electrical component housing.

16. The tractor-trailer highway parameter gauge as recited in claim 15, wherein said first visual indicator comprises a first optical fiber disposed within a first wrought tube, said second visual indicator comprises a second optical fiber disposed within a second wrought tube, said third visual indicator comprises a third optical fiber disposed within a third wrought tube, and said fourth visual indicator comprises a fourth optical fiber disposed within a fourth wrought tube.

17. The tractor-trailer highway parameter gauge as recited in claim 16, wherein said first optical fiber comprises an illuminated tip disposed at the upper end of said first wrought tube, said second optical fiber comprises an illuminated tip disposed at the upper end of said second wrought tube, said third optical fiber comprises an illuminated tip disposed at the upper end of said third wrought tube, and said fourth optical fiber comprises an illuminated tip disposed at the upper end of said fourth wrought tube.

18. The tractor-trailer highway parameter gauge as recited in claim 17, wherein said first optical fiber comprises an end disposed within a first port in said electrical component housing, said second optical fiber comprises an end disposed within a second port in said electrical component housing, said third optical fiber comprises an end disposed within a third port in said electrical component housing, and said fourth optical fiber comprises an end disposed within a forth port in said electrical component housing.

19. The tractor-trailer highway parameter gauge as recited in claim 18, wherein an electrical light source is housed within said electrical component housing, and wherein light from said electrical light source is emanated through said first port into said first optical fiber and through said second port into said second optical fiber, and through said third port into said third optical fiber and through said fourth port into said fourth optical fiber.

20. The tractor-trailer highway parameter gauge as recited in claim 19, wherein said first bracket assembly comprises a first L-shaped member comprising a foot fastened to said rail, said second bracket assembly comprises a second L-shaped member comprising a foot fastened to said rail, said third bracket assembly comprises a third L-shaped member comprising a foot fastened to said rail, and said fourth bracket assembly comprises a fourth L-shaped member comprising a foot fastened to said rail.

21. The tractor-trailer highway parameter gauge as recited in claim 20, wherein said foot of said first L-shaped member is fastened to said rail by a first threaded fastener engaged within said open cross section of said rail, said foot of said second L-shaped member is fastened to said rail by a second threaded fastener engaged within said open cross section of said rail, said foot of said third L-shaped member is fastened to said rail by a third threaded fastener engaged within said open cross section of said rail, said foot of said fourth L-shaped member is fastened to said rail by a fourth threaded fastener engaged within said open cross section of said rail, and wherein the positions of said first L-shaped member, said second L-shaped member, said third L-shaped member, and said fourth L-shaped member are adjustable along the length of said rail.

22. The tractor-trailer highway parameter gauge as recited in claim 21, wherein said first bracket assembly comprises a first clamp engaged with said first wrought tube of said first visual indicator, said second bracket assembly comprises a second clamp engaged with said second wrought tube of said second visual indicator, said third bracket assembly comprises a third clamp engaged with said third wrought tube of third visual indicator, and said fourth bracket assembly comprises a fourth clamp engaged with fourth wrought tube of said fourth visual indicator.

23. The tractor-trailer highway parameter gauge as recited in claim 22, wherein said first wrought tube is slidable within said first clamp, said second wrought tube is slidable within said second clamp, said third wrought tube is slidable within said third clamp, and said fourth wrought tube is slidable within said fourth clamp.

24. The tractor-trailer highway parameter gauge as recited in claim 23, wherein said first clamp is rotatably fastened to said first L-shaped member of said first bracket assembly, said second clamp is rotatably fastened to said second L-shaped member of said second bracket assembly, said third clamp is rotatably fastened to said third L-shaped member of said third bracket assembly, and said fourth clamp is rotatably fastened to said fourth L-shaped member of said fourth bracket assembly.

25. The tractor-trailer highway parameter gauge as recited in claim 19 wherein a first red filter is disposed between said electrical light source and said first optical fiber, a second red filter is disposed between said electrical light source and said second optical fiber, a first green filter is disposed between said electrical light source and said third optical fiber, and a second green filter is disposed between said electrical light source and said fourth optical fiber.

26. The tractor-trailer highway parameter gauge as recited in claim 19, wherein said means for supplying electrical power comprises a first wire and a second wire electrically connected to said electrical light source.

27. The tractor-trailer highway parameter gauge as recited in claim 26, wherein said means for supplying electrical power further comprises a jack electrically connected to said first wire and said second wire.

28. The tractor-trailer highway parameter gauge as recited in claim 27, wherein said means for supplying electrical power further comprises a battery electrically connected to said jack.

29. The tractor-trailer highway parameter gauge as recited in claim 15, further comprising a fifth electrically illuminated visual indicator mounted upon a fifth bracket assembly, wherein said fifth bracket assembly is fastened to said rail, and a sixth electrically illuminated visual indicator mounted upon a sixth bracket assembly, wherein said sixth bracket assembly is fastened to said rail.

30. The tractor-trailer highway parameter gauge as recited in claim 15, wherein said first electrically illuminated visual indicator comprises a first light-emitting diode electrically connected to said means for supplying power, said second electrically illuminated visual indicator comprises a second light-emitting diode electrically connected to said means for supplying power, said third electrically illuminated visual indicator comprises a third light-emitting diode electrically connected to said means for supplying power, and said fourth electrically illuminated visual indicator comprises a fourth light-emitting diode electrically connected to said means for supplying power.

31. The tractor-trailer highway parameter gauge as recited in claim 30, wherein said first light emitting diode and said second light emitting diode emit red light, and said third light emitting diode and said fourth light emitting diode emit green light.

32. The tractor-trailer highway parameter gauge as recited in claim 30, wherein said first light-emitting diode is disposed within a first wrought tube, said second light-emitting diode is disposed within a second wrought tube, third light-emitting diode is disposed within a third wrought tube, and said fourth light-emitting diode is disposed within a fourth wrought tube.

33. The tractor-trailer highway parameter gauge as recited in claim 15, further comprising a base adapter comprising a curved lower surface and a flat upper surface, wherein said base of said parameter gauge further comprises a lower surface, and wherein said lower surface of said base is contiguous with said upper flat surface of said base adapter.

34. A tractor-trailer highway parameter gauge comprising
   (a) a horizontally disposed base comprising an upper surface, and a rail fastened to said upper surface, said rail comprising an open cross-section defined by a horizontally disposed bottom side, a vertically disposed proximal side extending upwardly from a proximal end of said horizontally disposed bottom side, a vertically disposed distal side extending upwardly from a distal end of said horizontally disposed bottom side, a horizontally disposed proximal upper side extending horizontally from an upper end of said vertically disposed proximal side, and a horizontally disposed distal upper side extending horizontally from an upper end of said vertically disposed distal side;
   (b) a first electrically illuminated visual indicator mounted upon a first bracket assembly, wherein said first bracket assembly is fastened to said rail;
   (c) an electrical component housing operatively connected to said first and said second visual indicators; and
   (d) means for supplying electrical power to said electrical component housing.

35. The tractor-trailer highway parameter gauge as recited in claim 34 wherein said first visual indicator comprises a first optical fiber disposed within a first wrought tube.

36. The tractor-trailer highway parameter gauge as recited in claim 35 wherein said first optical fiber comprises an illuminated tip disposed at the upper end of said first wrought tube.

37. The tractor-trailer highway parameter gauge as recited in claim 36, wherein said first optical fiber comprises an end disposed within a first port in said electrical component housing.

38. The tractor-trailer highway parameter gauge as recited in claim 34, further comprising a second electrically illuminated visual indicator mounted upon a second bracket assembly wherein said second bracket assembly is fastened to said rail, and a third electrically illuminated visual indicator mounted upon a third bracket assembly, wherein said third bracket assembly is fastened to said rail.

* * * * *